US012354785B2

(12) United States Patent
Nagai et al.

(10) Patent No.: US 12,354,785 B2
(45) Date of Patent: Jul. 8, 2025

(54) MULTILAYER COIL COMPONENT

(71) Applicant: TDK CORPORATION, Tokyo (JP)

(72) Inventors: Yusuke Nagai, Tokyo (JP); Takashi Suzuki, Tokyo (JP); Kazuhiro Ebina, Tokyo (JP); Kunihiko Kawasaki, Tokyo (JP); Shinichi Kondo, Tokyo (JP); Yuya Ishima, Tokyo (JP); Shinichi Sato, Tokyo (JP); Seiichi Nakagawa, Tokyo (JP); Keito Yasuda, Tokyo (JP); Ryuichi Wada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 861 days.

(21) Appl. No.: 17/490,411

(22) Filed: Sep. 30, 2021

(65) Prior Publication Data

US 2022/0108835 A1 Apr. 7, 2022

(30) Foreign Application Priority Data

Oct. 2, 2020 (JP) ................................ 2020-167760

(51) Int. Cl.
*H01F 27/28* (2006.01)
*H01F 1/28* (2006.01)
*H01F 27/29* (2006.01)

(52) U.S. Cl.
CPC ............ *H01F 27/292* (2013.01); *H01F 1/28* (2013.01)

(58) Field of Classification Search
CPC .... H01F 27/292; H01F 1/28; H01F 2017/048; H01F 17/0013; H01F 17/04; H01F 27/04; H01F 27/24
USPC ........................................ 336/199, 200, 232
See application file for complete search history.

(56) References Cited

U.S. PATENT DOCUMENTS

| | | | |
|---|---|---|---|
| 2014/0132383 A1 | 5/2014 | Matsuura et al. | |
| 2014/0338185 A1 | 11/2014 | Muneuchi et al. | |
| 2018/0254138 A1* | 9/2018 | Koo | H01F 27/292 |
| 2018/0308626 A1 | 10/2018 | Kato et al. | |
| 2019/0198210 A1* | 6/2019 | Suzuki | H01F 1/26 |
| 2020/0135371 A1* | 4/2020 | Tonoyama | C22C 38/08 |
| 2020/0312563 A1 | 10/2020 | Nagai et al. | |
| 2021/0272740 A1* | 9/2021 | Wakabayashi | H01F 27/2804 |
| 2022/0037068 A1 | 2/2022 | Tonoyama et al. | |
| 2022/0051843 A1 | 2/2022 | Koo et al. | |

FOREIGN PATENT DOCUMENTS

| | | |
|---|---|---|
| CN | 108538555 A | 9/2018 |
| JP | 2012-238841 A | 12/2012 |
| JP | 2014-225590 A | 12/2014 |
| JP | 2020-072183 A | 5/2020 |
| JP | 2020-161518 A | 10/2020 |
| WO | 2017/130719 A1 | 8/2017 |

* cited by examiner

*Primary Examiner* — Shawki S Ismail
*Assistant Examiner* — Kazi S Hossain
(74) *Attorney, Agent, or Firm* — Oliff PLC

(57) ABSTRACT

A multilayer coil component includes: an element body containing a plurality of metal magnetic particles; a coil disposed in the element body; and an external electrode disposed on a surface of the element body and electrically connected to the coil. At least a part of a void part between the metal magnetic particles in the element body is filled with a first resin, the external electrode has a resin electrode containing a second resin and a conductor powder dispersed in the second resin, and the second resin connected from the resin electrode extends into the element body.

5 Claims, 8 Drawing Sheets

MULTILAYER COIL COMPONENT

TECHNICAL FIELD

The present disclosure relates to a multilayer coil component.

BACKGROUND

The coil component described in Japanese Unexamined Patent Publication No. 2012-238841 is an example of existing multilayer coil components. The element body of this existing coil component contains a plurality of metal particles made of a soft magnetic alloy. At least a part of a void that has resulted from metal particle accumulation is filled with a resin material.

SUMMARY

In a case where the plurality of metal particles are contained in the element body, the void is likely to be actually generated in the element body even in a case where the filling is performed with the resin material. Accordingly, adhesion strength improvement between the element body and an external electrode is required in the multilayer coil component.

The present disclosure has been made in order to solve the above problem, and an object of the present disclosure is to provide a multilayer coil component capable of improving the adhesion strength between an element body and an external electrode.

A multilayer coil component according to one aspect of the present disclosure includes: an element body containing a plurality of metal magnetic particles; a coil disposed in the element body; and an external electrode disposed on a surface of the element body and electrically connected to the coil, in which at least a part of a space between the metal magnetic particles in the element body is filled with a first resin, the external electrode has a resin electrode containing a second resin and a conductor powder dispersed in the second resin, and the second resin connected from the resin electrode extends into the element body.

In this multilayer coil component, the second resin connected from the resin electrode extends into the element body. As a result, even in a case where the element body contains the plurality of metal magnetic particles, the adhesion strength between the element body and the resin electrode can be enhanced. By the adhesion strength between the element body and the resin electrode being enhanced, peeling of the resin electrode from the element body can be suppressed and the reliability of the multilayer coil component can be improved.

The first resin and the second resin may be bonded to each other in the element body. In this case, the adhesion strength between the element body and the resin electrode can be further enhanced by the first resin and the second resin being bonded.

The first resin and the second resin may be the same kind of resin. In this case, the bonding strength between the first resin and the second resin can be more sufficiently ensured and the adhesion strength between the element body and the resin electrode can be further enhanced.

The external electrode may have a base baking electrode between the resin electrode and the element body. In this case, the electrical connection between the coil and the resin electrode can be improved via the base baking electrode.

The second resin may extend to a part where the element body and the base baking electrode are in contact with each other in the element body. In this case, the second resin extends so as to wrap around the base baking electrode, and thus the adhesion strength between the element body and the resin electrode can be further enhanced.

The second resin may extend to a part where the element body and the resin electrode are not in contact with each other in the element body. In this case, the extension region of the second resin in the element body can be sufficiently expanded and the adhesion strength between the element body and the resin electrode can be further enhanced.

DETAILED DESCRIPTION

Hereinafter, a preferred embodiment of a multilayer coil component according to one aspect of the present disclosure will be described in detail with reference to the drawings.

Figure 1:
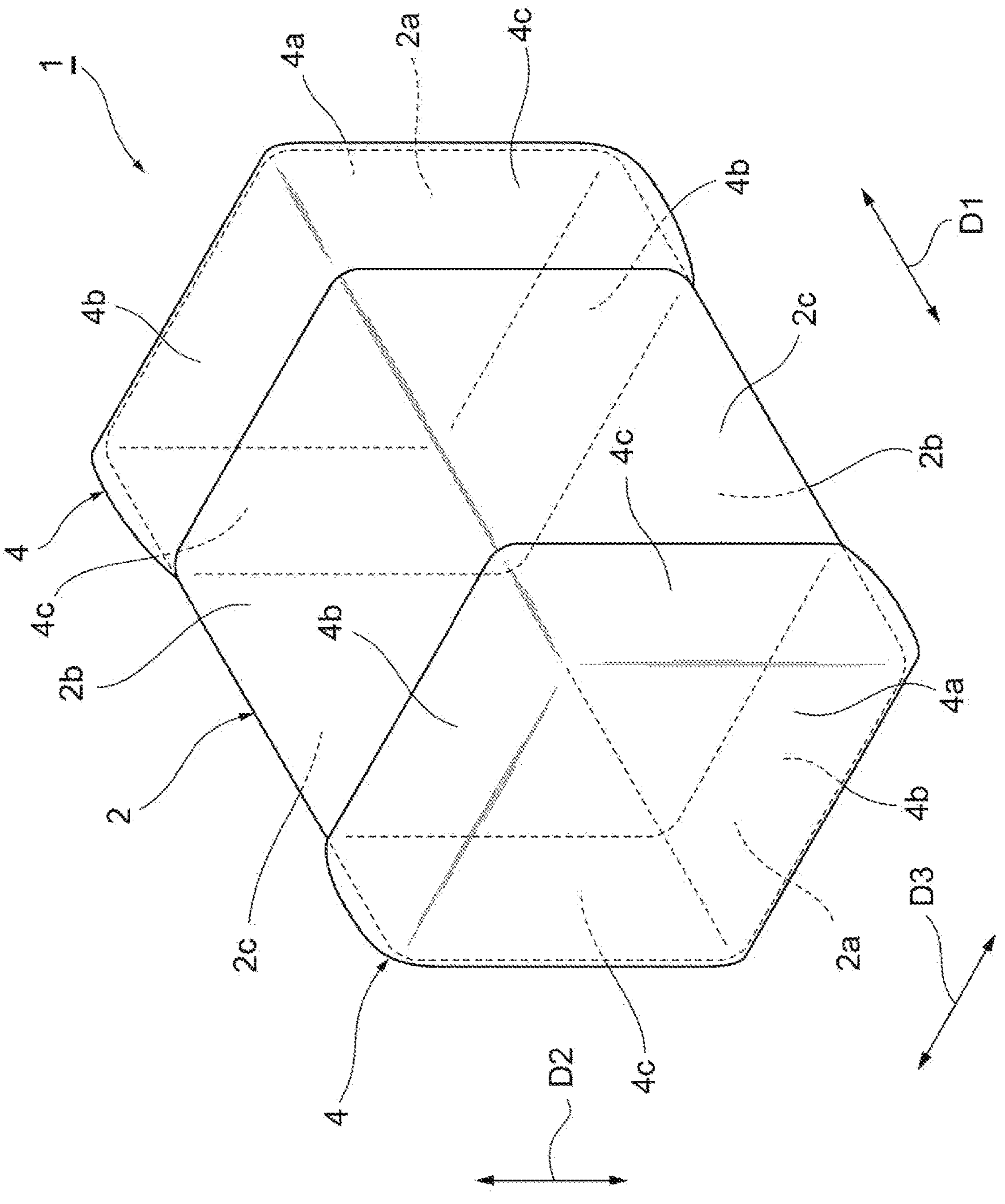
FIG. 1 is a perspective view illustrating an embodiment of a multilayer coil component.
Figure 2:
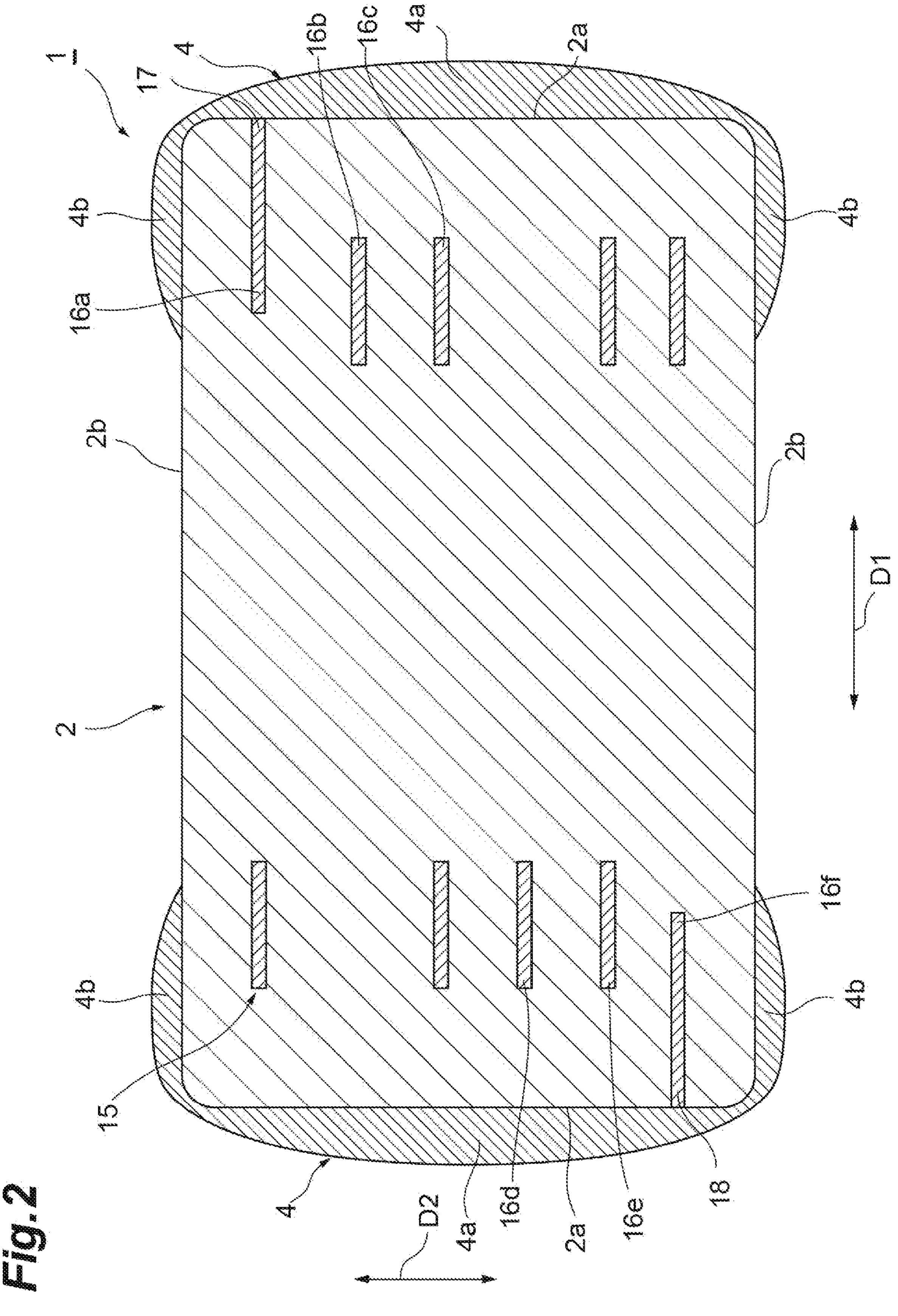
FIG. 2 is a diagram illustrating a cross-sectional configuration of the multilayer coil component illustrated in FIG. 1.
Figure 3:
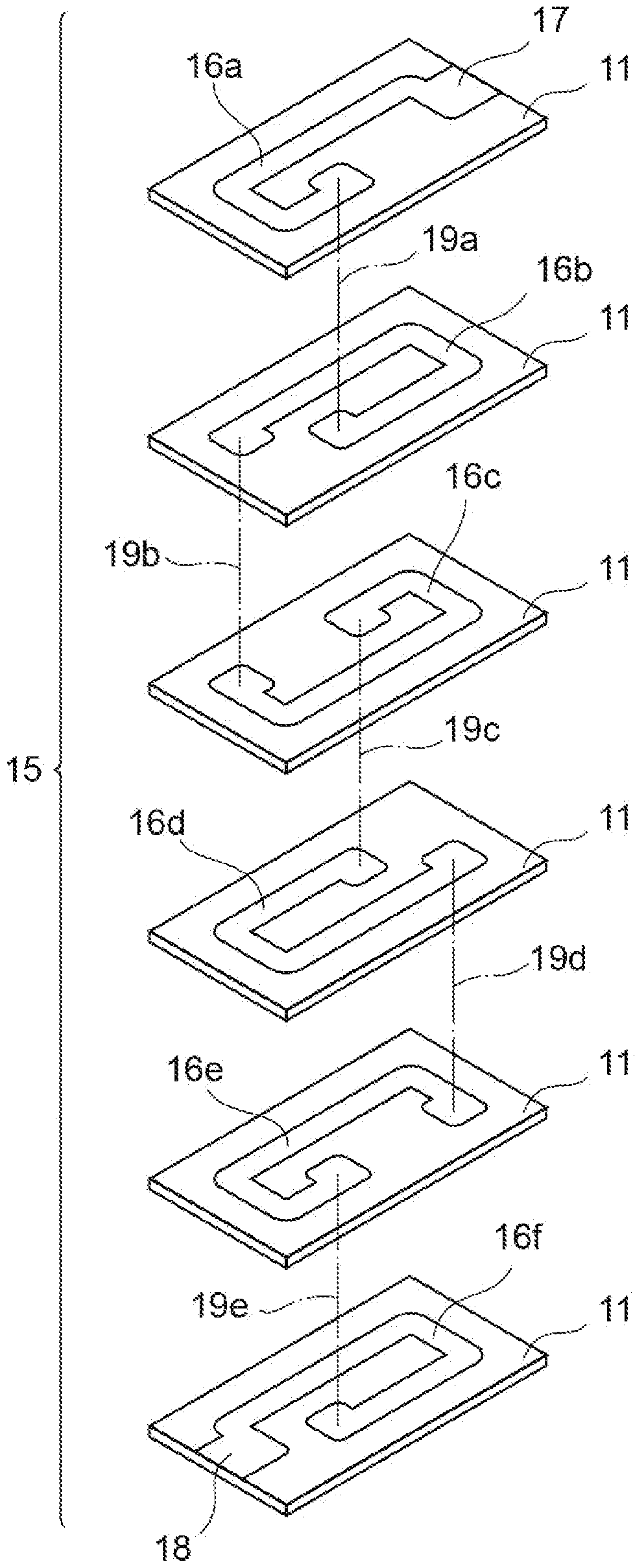
FIG. 3 is a perspective view illustrating the configuration of a coil.

The configuration of a multilayer coil component 1 according to the present embodiment will be described with reference to FIGS. 1 to 3. FIG. 1 is a perspective view illustrating an embodiment of a multilayer coil component. FIG. 2 is a diagram illustrating a cross-sectional configuration of the multilayer coil component illustrated in FIG. 1. FIG. 3 is a perspective view illustrating the configuration of a coil.

As illustrated in FIG. 1, the multilayer coil component 1 includes an element body 2 having a rectangular parallelepiped shape and a pair of external electrodes 4 and 4. The pair of external electrodes 4 and 4 are respectively disposed in both end portions of the element body 2 and are separated from each other. The rectangular parallelepiped shape includes a rectangular parallelepiped shape in which the corner and ridge portions are chamfered and a rectangular parallelepiped shape in which the corner and ridge portions are rounded. The multilayer coil component 1 can be applied to, for example, a bead inductor or a power inductor.

The rectangular parallelepiped element body 2 has a pair of end surfaces 2*a* and 2*a* facing each other, a pair of main surfaces 2*b* and 2*b* facing each other, and a pair of side surfaces 2*c* and 2*c* facing each other. The end surfaces 2*a* and 2*a* are positioned so as to be adjacent to the pair of main surfaces 2*b* and 2*b*. In addition, the end surfaces 2*a* and 2*a* are positioned so as to be adjacent to the pair of side surfaces 2*c* and 2*c*. One of the main surfaces 2*b* can be a surface (mounting surface) facing another electronic device when, for example, the multilayer coil component 1 is mounted on the electronic device (such as a circuit board and an electronic component).

In the present embodiment, the facing direction of the pair of end surfaces 2*a* and 2*a* (first direction D1) is the length direction of the element body 2. The facing direction of the pair of main surfaces 2*b* and 2*b* (second direction D2) is the height direction of the element body 2. The facing direction of the pair of side surfaces 2*c* and 2*c* (third direction D3) is the width direction of the element body 2. The first direction D1, the second direction D2, and the third direction D3 are orthogonal to each other.

The length of the element body 2 in the first direction D1 is larger than the lengths of the element body 2 in the second direction D2 and the third direction D3. The length of the element body 2 in the second direction D2 is equivalent to the length of the element body 2 in the third direction D3. In other words, in the present embodiment, the pair of end surfaces 2*a* and 2*a* have a square shape and the pair of main surfaces 2*b* and 2*b* and the pair of side surfaces 2*c* and 2*c* have a rectangular shape.

The length of the element body 2 in the first direction D1 may be equivalent to the lengths of the element body 2 in the second direction D2 and the third direction D3. The length of the element body 2 in the second direction D2 may be different from the length of the element body 2 in the third direction D3. The equivalence includes, in addition to equality, a slight difference or a manufacturing error within a preset range. For example, a plurality of values may be regarded as equivalent insofar as the plurality of values are included in the range of 95% to 105% of the average value of the plurality of values.

The pair of end surfaces 2*a* and 2*a* extend in the second direction D2 so as to connect the pair of main surfaces 2*b* and 2*b*. The pair of end surfaces 2*a* and 2*a* also extend in the third direction D3 so as to connect the pair of side surfaces 2*c* and 2*c*. The pair of main surfaces 2*b* and 2*b* extend in the first direction D1 so as to connect the pair of end surfaces 2*a* and 2*a*. The pair of main surfaces 2*b* and 2*b* also extend in the third direction D3 so as to connect the pair of side surfaces 2*c* and 2*c*. The pair of side surfaces 2*c* and 2*c* extend in the first direction D1 so as to connect the pair of end surfaces 2*a* and 2*a*. The pair of side surfaces 2*c* and 2*c* also extend in the second direction D2 so as to connect the pair of main surfaces 2*b* and 2*b*.

The element body 2 is configured by laminating a plurality of magnetic body layers 11 (see FIG. 3). The magnetic body layers 11 are laminated in the facing direction of the main surfaces 2*b* and 2*b*. In other words, the lamination direction of the magnetic body layers 11 coincides with the facing direction of the main surfaces 2*b* and 2*b* (hereinafter, the facing direction of the main surfaces 2*b* and 2*b* will be referred to as "lamination direction"). Each magnetic body layer 11 has a substantially rectangular shape. In the actual element body 2, the magnetic body layers 11 are integrated to the extent that the boundaries between the layers cannot be visually recognized.

Figure 4:
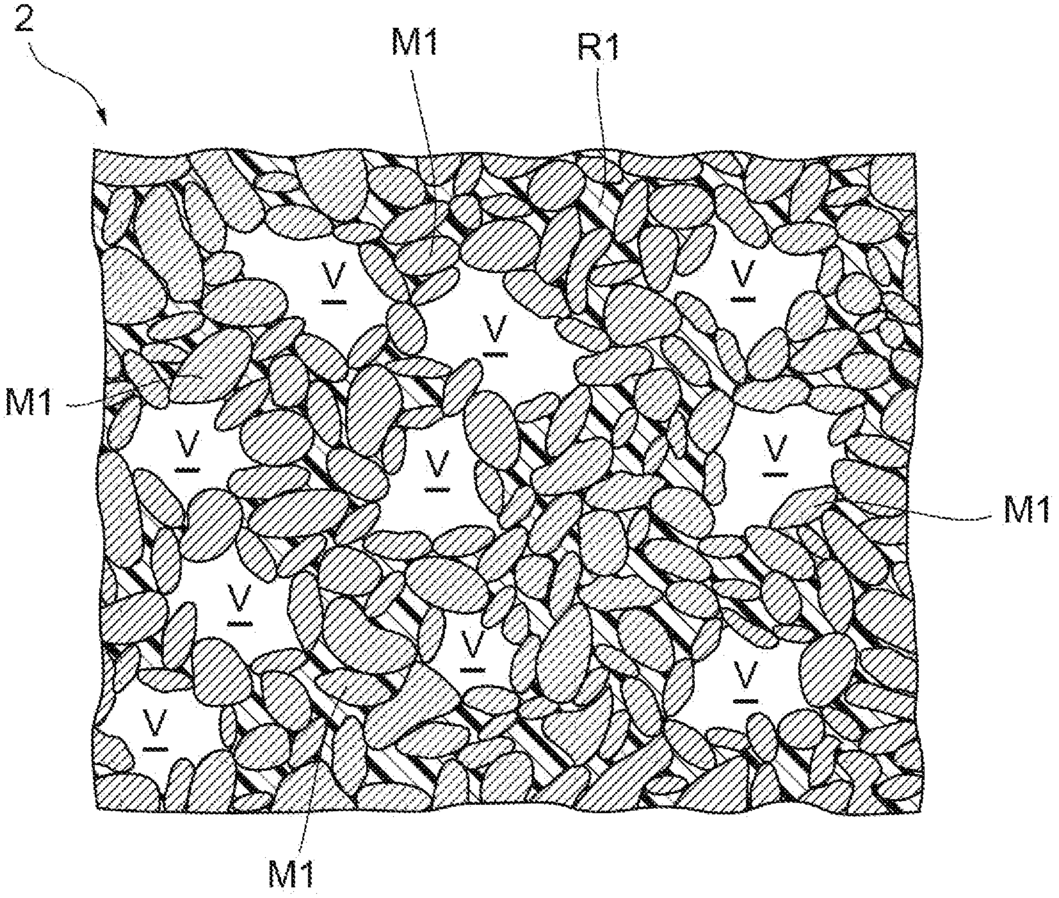
FIG. 4 is an enlarged schematic view illustrating a cross-sectional configuration of an inner portion of an element body.

As illustrated in FIG. 4, each magnetic body layer 11 contains a plurality of metal magnetic particles M1. The metal magnetic particles M1 are made of, for example, a soft magnetic alloy. The soft magnetic alloy is, for example, a Fe—Si-based alloy. In a case where the soft magnetic alloy is the Fe—Si-based alloy, the soft magnetic alloy may contain P. The soft magnetic alloy may be, for example, a Fe—Ni—Si-M-based alloy. "M" contains one or more elements selected from Co, Cr, Mn, P, Ti, Zr, Hf, Nb, Ta, Mo, Mg, Ca, Sr, Ba, Zn, B, Al, and rare earth elements.

In the magnetic body layer 11, the metal magnetic particles M1 and M1 are bonded to each other. The metal magnetic particles M1 and M1 are bonded to each other by, for example, the oxide films formed on the surfaces of the metal magnetic particles M1 being bonded to each other. The average particle diameter of the metal magnetic particles M1 is, for example, 0.5 μm to 15 μm. In the present embodiment, the average particle diameter of the metal magnetic particles M1 is 5 μm. "Average particle diameter" means the particle diameter at an integrated value of 50% in a particle size distribution obtained by a laser diffraction/scattering method.

As illustrated in FIG. 4, the element body 2 contains a first resin R1. The first resin R1 exists between the plurality of metal magnetic particles M1 and M1. The first resin R1 is a resin that has electrical insulation. For example, a silicone resin, a phenol resin, an acrylic resin, an epoxy resin, or the like is used as the first resin R1. The first resin R1 does not completely fill the space between the plurality of metal magnetic particles M1 and M1 in the element body 2, and a void part V exists in at least a part of the space between the plurality of metal magnetic particles M1 and M1.

The porosity caused by the void part V may be, for example, higher on the surface side than on the middle side of the element body 2. In one example, the porosity on the middle side of the element body 2 is less than 10% and the porosity on the surface side of the element body 2 is approximately 30%. The porosity can be calculated by, for example, magnifying the cross section of the element body 2 by a factor of 3000 with a scanning electron microscope (SEM) and obtaining the ratio of the area of the void part V to the area of the cross section of the element body 2.

As illustrated in FIGS. 2 and 3, a coil 15 is disposed in the element body 2. The coil 15 includes a plurality of coil conductors 16*a* to 16*f*. The plurality of coil conductors 16*a* to 16*f* contain a conductive material (such as Ag or Pd). The plurality of coil conductors 16*a* to 16*f* are configured as sintered bodies of conductive paste containing a conductive material (such as Ag powder or Pd powder).

The coil conductor 16*a* includes a connecting conductor 17. The connecting conductor 17 is disposed on one end surface 2*a* side of the element body 2 and has an end portion exposed to one end surface 2*a*. The end portion of the connecting conductor 17 is exposed at a position close to one main surface 2*b* on one end surface 2*a* and is connected to one external electrode 4. In other words, the coil 15 is electrically connected to one external electrode 4 via the connecting conductor 17. In the present embodiment, the conductor pattern of the coil conductor 16*a* and the conductor pattern of the connecting conductor 17 are formed integrally and continuously.

The coil conductor 16*f* includes a connecting conductor 18. The connecting conductor 18 is disposed on the other end surface 2*a* side of the element body 2 and has an end portion exposed to the other end surface 2*a*. The end portion of the connecting conductor 18 is exposed at a position close to the other main surface 2*b* on the other end surface 2*a* and is connected to the other external electrode 4. In other words, the coil 15 is electrically connected to the other external electrode 4 via the connecting conductor 18. In the present embodiment, the conductor pattern of the coil conductor 16*f* and the conductor pattern of the connecting conductor 18 are formed integrally and continuously.

The plurality of coil conductors 16*a* to 16*f* are formed in the lamination direction of the magnetic body layers 11 in the element body 2. The plurality of coil conductors 16*a* to 16*f* are arranged in the order of the coil conductor 16*a*, the coil conductor 16*b*, the coil conductor 16*c*, the coil conductor 16*d*, the coil conductor 16*e*, and the coil conductor 16*f*. In the present embodiment, the coil 15 is configured by the part of the coil conductor 16*a* other than the connecting conductor 17, the plurality of coil conductors 16*b* to 16*d*, and the part of the coil conductor 16*f* other than the connecting conductor 18.

The end portions of the coil conductors 16*a* to 16*f* are connected to each other by through hole conductors 19*a* to 19*e*. The coil conductors 16*a* to 16*f* are electrically connected to each other by the through hole conductors 19*a* to 19*e*. The coil 15 is configured by electrically connecting the plurality of coil conductors 16*a* to 16*f*. Each of the through hole conductors 19*a* to 19*e* contains a conductive material (such as Ag or Pd). Each of the through hole conductors 19*a* to 19*e* is configured as a sintered body of conductive paste containing a conductive material (such as Ag powder or Pd powder) as in the case of the plurality of coil conductors 16*a* to 16*f*.

The external electrode 4 is disposed so as to cover the end portion of the element body 2 on the end surface 2*a* side. As illustrated in FIG. 1, the external electrode 4 has an electrode part 4*a* covering the end surface 2*a*, electrode parts 4*b* and 4*b* overhanging the pair of main surfaces 2*b* and 2*b*, and electrode parts 4*c* and 4*c* overhanging the pair of side surfaces 2*c* and 2*c*. In other words, the external electrode 4 is formed of the five surfaces formed by the electrode parts 4*a*, 4*b*, and 4*c*.

The electrode part 4*a* is disposed so as to cover the entire end portions of the connecting conductors 17 and 18 exposed on the end surface 2*a*, and the connecting conductors 17 and 18 are directly connected to the external electrode 4. In other words, the connecting conductors 17 and 18 connect the end portion of the coil 15 and the electrode part 4*a*. As a result, the coil 15 is electrically connected to the external electrode 4.

The electrode parts 4*a*, 4*b*, and 4*c* adjacent to each other are continuous and electrically connected in the ridge portion of the element body 2. The electrode part 4*a* and the electrode part 4*b* are connected in the ridge portion between the end surface 2*a* and the main surface 2*b*. The electrode part 4*a* and the electrode part 4*c* are connected in the ridge portion between the end surface 2*a* and the side surface 2*c*.

Figure 5:
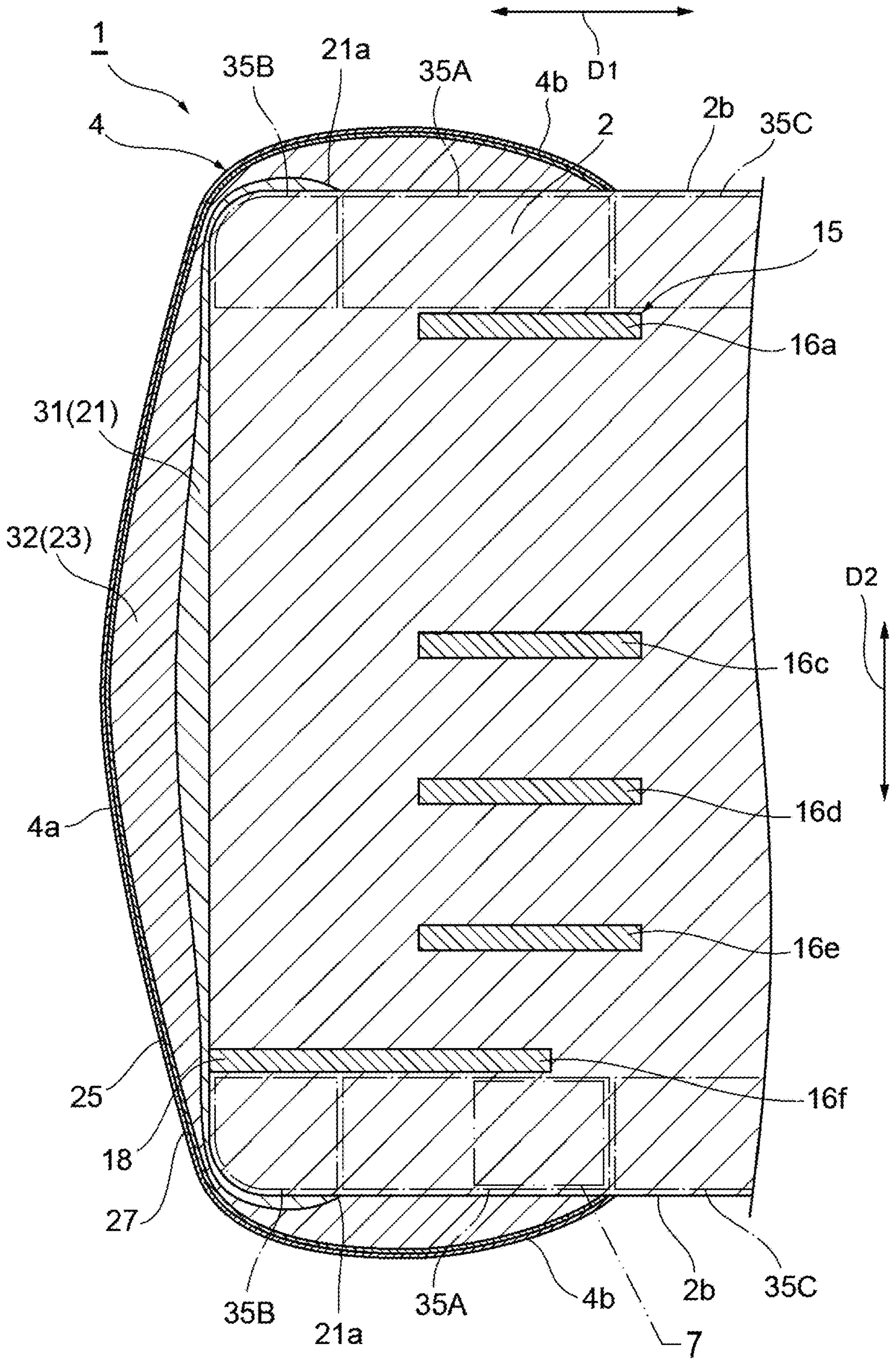
FIG. 5 is a diagram illustrating a cross-sectional configuration of an external electrode and the element body around the external electrode.

As illustrated in FIG. 5, the external electrode 4 has a first electrode layer 21, a second electrode layer 23, a third electrode layer 25, and a fourth electrode layer 27. Each of the electrode parts 4*a*, 4*b*, and 4*c* described above is configured to include the first electrode layer 21, the second electrode layer 23, the third electrode layer 25, and the fourth electrode layer 27. The fourth electrode layer 27 constitutes the outermost layer of the external electrode 4. Although a cross-sectional configuration of one external electrode 4 is illustrated in FIG. 5, the other external electrode 4 has the same configuration.

The first electrode layer 21 is a base baking electrode 31 formed by applying conductive paste to the surface of the element body 2 and baking it. The first electrode layer 21 is formed by sintering a metal component (metal powder) contained in the conductive paste. In the present embodiment, the first electrode layer 21 is a sintered metal layer made of Ag. The first electrode layer 21 may be a sintered metal layer made of Pd. Powder made of Ag or Pd and mixed with a glass component, an organic binder, and an organic solvent is used as the conductive paste. The first electrode layer 21 is in contact with and electrically connected to the connecting conductors 17 and 18 of the coil 15 on the end surface 2*a* of the element body 2.

Figure 6:
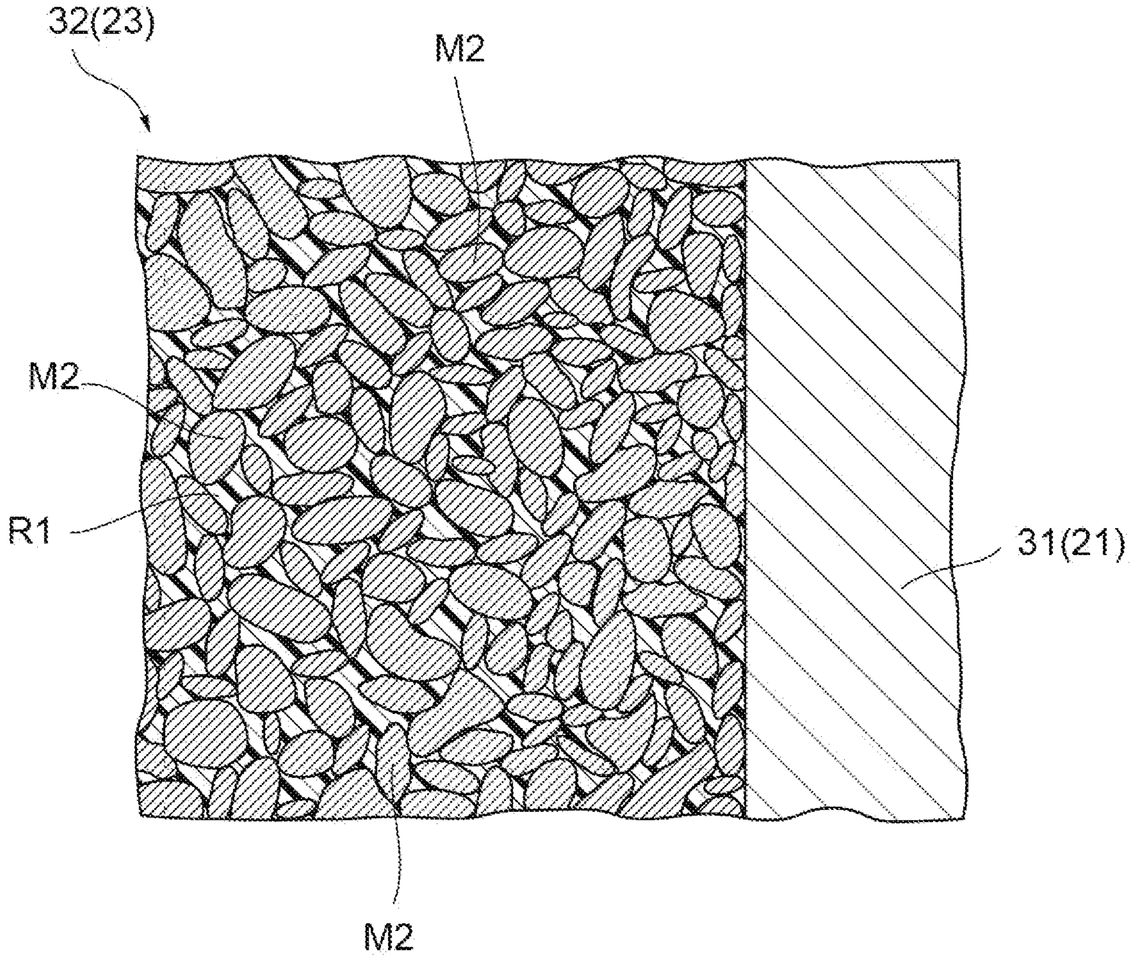
FIG. 6 is an enlarged schematic view illustrating a cross-sectional configuration of a second electrode layer.

The second electrode layer 23 is a resin electrode 32 formed by curing a second resin R2 applied on the first electrode layer 21. The second electrode layer 23 is formed so as to cover the entire first electrode layer 21. As illustrated in FIG. 6, the second electrode layer 23 is configured by mixing a conductor powder M2 and an organic solvent or the like with the second resin R2. For example, Ag powder or the like is used as the conductor powder M2. A plurality of the conductor powders M2 dispersed in the second resin R2 are in contact with the first electrode layer 21, which is a base. As a result, the conduction between the coil 15 and the second electrode layer 23 can be sufficiently ensured as compared with the case of direct contact between the connecting conductors 17 and 18 of the coil 15 and the second electrode layer 23.

For example, a silicone resin, a phenol resin, an acrylic resin, an epoxy resin, a polyimide resin, or the like is used as the thermosetting resin constituting the second resin R2. In the present embodiment, the first resin R1 used for the element body 2 and the second resin R2 used for the resin electrode 32 are the same kind of resin. For example, the second resin R2 used for the resin electrode 32 is also an epoxy resin in a case where the first resin R1 used for the element body 2 is an epoxy resin. In addition, the second resin R2 used for the resin electrode 32 is also a phenol resin in a case where, for example, the first resin R1 used for the element body 2 is a phenol resin.

The third electrode layer 25 is formed on the second electrode layer 23 by a plating method. In the present embodiment, the third electrode layer 25 is a Ni plating layer formed by Ni plating on the second electrode layer 23. The third electrode layer 25 may be a Sn plating layer, a Cu plating layer, or an Au plating layer. The fourth electrode layer 27 is formed on the third electrode layer 25 by a plating method. In the present embodiment, the fourth electrode layer 27 is a Sn plating layer formed by Sn plating on the third electrode layer 25. The fourth electrode layer 27 may be a Cu plating layer or an Au plating layer. The third electrode layer 25 and the fourth electrode layer 27 constitute the double plating layer formed on the second electrode layer 23.

Next, the relationship between the element body 2 and the second electrode layer 23 (resin electrode 32) described above will be described in more detail.

As illustrated in FIG. 5, the external electrode 4 of the multilayer coil component 1 is provided with the second electrode layer 23 so as to cover the first electrode layer 21. In other words, the second electrode layer 23 is provided on the first electrode layer 21 such that an edge 21*a* of the first electrode layer 21 is hidden by the second electrode layer 23. Formed on the main surfaces 2*b* and 2*b* and the side surfaces 2*c* and 2*c* of the element body 2 as a result are a part 35A with which the resin electrode 32 is in contact, a part 35B with which the base baking electrode 31 is in contact, and a part 35C with which neither the resin electrode 32 nor the base baking electrode 31 is in contact, which are three parts in different states.

The part 35A in contact with the resin electrode 32 projects with a constant width in the first direction D1 from the edge 21*a* of the first electrode layer 21. The part 35B in contact with the base baking electrode 31 is positioned closer to the end surface 2*a* side than the part 35A in contact with the resin electrode 32. The part 35C in contact with neither the resin electrode 32 nor the base baking electrode 31 is positioned on the side opposite to the end surface 2*a* with respect to the part 35A in contact with the resin electrode 32.

Figure 7:
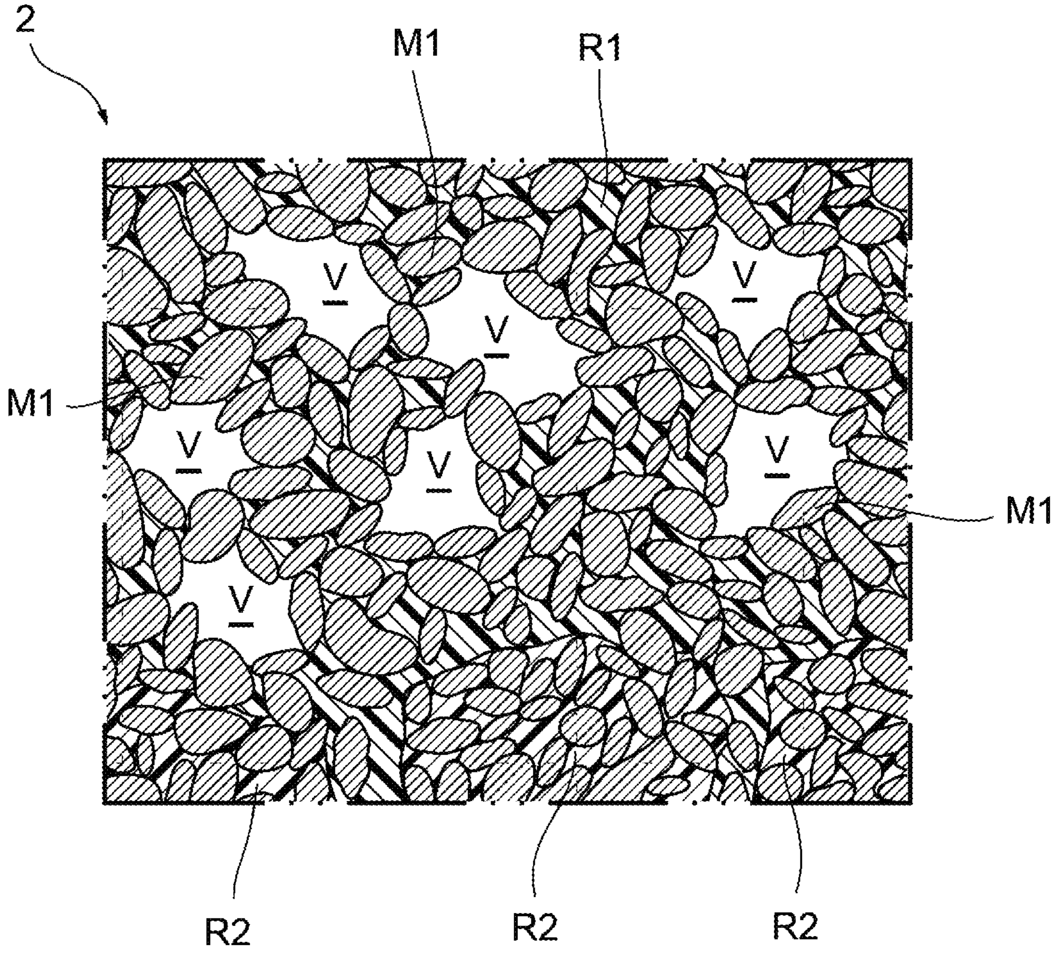
FIG. 7 is an enlarged schematic view illustrating a cross-sectional configuration of the inner portion of the element body in a dash-dot-dot-dash line region of FIG. 5.

At the three parts 35A, 35B, and 35C, the second resin R2 connected from the resin electrode 32 extends into the element body 2 as illustrated in FIG. 7, which is a dash-dot-dot-dash line region 7 of FIG. 5. At the part 35A in contact with the resin electrode 32, the second resin R2 connected from the resin electrode 32 enters the element body 2 and fills the void part V existing on the surface of the element body 2 and in the vicinity of the surface. In the element body 2, the first resin R1 in the element body 2 and the second resin R2 connected from the resin electrode 32 are bonded to each other.

At the part 35A in contact with the resin electrode 32, the second resin R2 has any entry depth from the surface of the element body 2. The second resin R2 may, for example, reach the coil conductor 16*a* or 16*f* closest to the main surface 2*b* in the second direction D2 and reach a position between the surface of the element body 2 and the coil conductor 16*a* or 16*f*. The entry depth in the third direction D3 may be almost equal to the entry depth in the second direction D2. The entry depth is defined by, for example, the average value at the part 35A in contact with the resin electrode 32.

At the part 35B in contact with the base baking electrode 31, the second resin R2 connected from the resin electrode 32 wraps around the base baking electrode 31 from the part 35A in contact with the resin electrode 32 and extends in the first direction D1 toward the end surface 2*a*. As in the case of the part 35A in contact with the resin electrode 32, at the part 35B, the second resin R2 fills the void part V existing on the surface of the element body 2 and in the vicinity of the surface. In the element body 2, the second resin R2 has any extension length in the first direction D1 at the part 35B in contact with the base baking electrode 31 where the first resin R1 in the element body 2 and the second resin R2 connected from the resin electrode 32 are bonded to each other. The second resin R2 may or may not reach the end surface 2*a*.

The second resin R2 has any entry depth from the surface of the element body 2 at the part 35B in contact with the base baking electrode 31. As in the case of the part 35A in contact with the resin electrode 32, at the entry depth, the second resin R2 may, for example, reach the coil conductor 16*a* or 16*f* closest to the main surface 2*b* in the second direction D2 and reach a position between the surface of the element body 2 and the coil conductor 16*a* or 16*f*. The entry depth of the second resin R2 at the part 35B in contact with the base baking electrode 31 may be equal to, be exceeded by, or exceed the entry depth of the second resin R2 at the part 35A in contact with the resin electrode 32.

The second resin R2 connected from the resin electrode 32 extends in the first direction D1 toward the middle of the element body 2 at the part 35C in contact with neither the resin electrode 32 nor the base baking electrode 31. As in the case of the part 35A in contact with the resin electrode 32, at the part 35C, the second resin R2 fills the void part V existing on the surface of the element body 2 and in the vicinity of the surface. In the element body 2, the first resin R1 in the element body 2 and the second resin R2 connected from the resin electrode 32 are bonded to each other. The second resin R2 has any extension length in the first direction D1 at the part 35C in contact with neither the resin electrode 32 nor the base baking electrode 31. The extension length of the second resin R2 is, for example, almost equal to the extension length of the second resin R2 in the first direction D1 at the part 35B in contact with the base baking electrode 31.

The second resin R2 has any entry depth from the surface of the element body 2 at the part 35C in contact with neither the resin electrode 32 nor the base baking electrode 31. As in the case of the part 35A in contact with the resin electrode 32, at the entry depth, the second resin R2 may, for example, reach the coil conductor 16*a* or 16*f* closest to the main surface 2*b* in the second direction D2 and reach a position between the surface of the element body 2 and the coil conductor 16*a* or 16*f*. The entry depth of the second resin R2 at the part 35C in contact with neither the resin electrode 32 nor the base baking electrode 31 may be equal to, be exceeded by, or exceed the entry depth of the second resin R2 at the part 35A in contact with the resin electrode 32.

In a case where the multilayer coil component 1 described above is manufactured, the plurality of magnetic body layers 11 are laminated first and the laminate is fired. As a result, the element body 2 in which the coil 15 is disposed is obtained. Next, the first electrode layer 21 (base baking electrode 31) is formed on the element body 2. Further, the element body 2 on which the first electrode layer 21 is formed is impregnated with the first resin R1 and the first resin R1 is allowed to enter the space between the plurality of metal magnetic particles M1 and M1 in the element body 2. After the impregnation with the first resin R1, the surface of the element body 2 is cleaned with a cleaning liquid. As a result of the cleaning of the surface of the element body 2, at least a part of the first resin R1 on the surface of the element body 2 and in the vicinity of the surface is removed and the porosity of the void part V on the surface of the element body 2 and in the vicinity of the surface becomes higher than the porosity of the void part V on the middle side of the element body 2.

After the surface of the element body 2 is cleaned, the second resin R2 containing the conductor powder M2 and an organic solvent or the like is applied to the element body 2 so as to cover the first electrode layer 21 and the second electrode layer 23 is formed on the first electrode layer 21. When the second electrode layer 23 is formed, at the part 35A where the resin electrode 32 comes into contact with the element body 2, capillarity causes the second resin R2 to enter the void part V in the element body 2 and the first resin R1 and the second resin R2 are bonded to each other.

The second resin R2 that has entered the element body 2 extends in the first direction D1 from the part 35A in contact with the resin electrode 32 toward each of the end surface 2*a* and the middle of the element body 2. Also at the part 35B in contact with the base baking electrode 31 and the part 35C in contact with neither the resin electrode 32 nor the base baking electrode 31, capillarity causes the second resin R2 to enter the void part V in the element body 2 and the first resin R1 and the second resin R2 are bonded to each other. The third electrode layer 25 and the fourth electrode layer 27 are formed in this order after the formation of the second electrode layer 23. As a result, the external electrode 4 is formed on the element body 2 and the multilayer coil component 1 illustrated in FIG. 1 is obtained.

As described above, in the multilayer coil component 1, the second resin R2 connected from the resin electrode 32 extends into the element body 2 (see FIG. 7). As a result, even in a case where the element body 2 contains the plurality of metal magnetic particles M1, the adhesion strength between the element body 2 and the resin electrode 32 can be enhanced by the second resin R2 entering the void part V in the element body 2. By the adhesion strength between the element body 2 and the resin electrode 32 being enhanced, peeling of the resin electrode 32 from the element body 2 can be suppressed and the reliability of the multilayer coil component 1 can be improved.

In the present embodiment, the first resin R1 and the second resin R2 are bonded in the element body 2. By the first resin R1 and the second resin R2 being bonded in the element body 2, the adhesion strength between the element body 2 and the resin electrode 32 can be further enhanced. In the present embodiment, the first resin R1 and the second resin R2 are the same kind of resin. Accordingly, the bonding strength between the first resin R1 and the second resin R2 in the element body 2 can be more sufficiently ensured and the adhesion strength between the element body 2 and the resin electrode 32 can be further enhanced.

In the present embodiment, the external electrode 4 has the base baking electrode 31 between the resin electrode 32 and the element body 2. The base baking electrode 31 is electrically connected to the connecting conductors 17 and 18 in the coil 15 on the end surface 2*a* of the element body 2 (see FIG. 6). In addition, the plurality of conductor powders M2 dispersed in the second resin R2 are in contact with the base baking electrode 31. With such a configuration, the electrical connection between the coil 15 and the resin electrode 32 can be improved via the base baking electrode 31.

In the present embodiment, the second resin R2 extends to the part 35B where the element body 2 and the base baking electrode 31 are in contact with each other in the element body 2. As a result, the second resin R2 extends so as to wrap around the base baking electrode 31, and thus the adhesion strength between the element body 2 and the resin electrode 32 can be further enhanced. In addition, the second resin R2 extends to the corner portion of the element body 2 or the vicinity of the corner portion, and thus peeling of the resin electrode 32 from the element body 2 can be suitably suppressed even in the corner portion of the element body 2 where stress concentration is likely to occur.

In the present embodiment, the second resin R2 extends to the part 35C where the element body 2 and the resin electrode 32 are not in contact with each other in the element body 2. As a result, the extension region of the second resin R2 in the element body 2 can be sufficiently expanded and the adhesion strength between the element body 2 and the resin electrode 32 can be further enhanced.

The present disclosure is not limited to the embodiment described above. For example, the second resin R2 may not completely fill the void part V in the element body 2. In other words, the void part V where the second resin R2 has not entered may remain on the surface of the element body 2 or in the vicinity of the surface and the void part V may remain at a part of the bonding part between the first resin R1 and the second resin R2 in the element body 2.

The second resin R2 connected from the resin electrode 32 may extend into the element body 2, and the first resin R1 and the second resin R2 do not necessarily have to be bonded in the element body 2. The part where the first resin R1 and the second resin R2 are bonded and the part where the first resin R1 and the second resin R2 are not bonded may be mixed in the element body 2.

The second resin R2 may extend into the element body 2 at the part 35A where the element body 2 and the resin electrode 32 are in contact with each other. The second resin R2 does not necessarily have to extend to the part 35B where the element body 2 and the base baking electrode 31 are in contact with each other and the part 35C where the element body 2 and the resin electrode 32 are not in contact with each other. In addition, the first resin R1 and the second resin R2 may not be the same kind of resin. For example, the first resin R1 may be a phenol resin and the second resin R2 may be an epoxy resin.

In the magnetic body layer 11, non-magnetic ceramic particles smaller in diameter than the metal magnetic particles M1 may exist in at least a part of the space between the plurality of metal magnetic particles M1 and M1.

Figure 8:
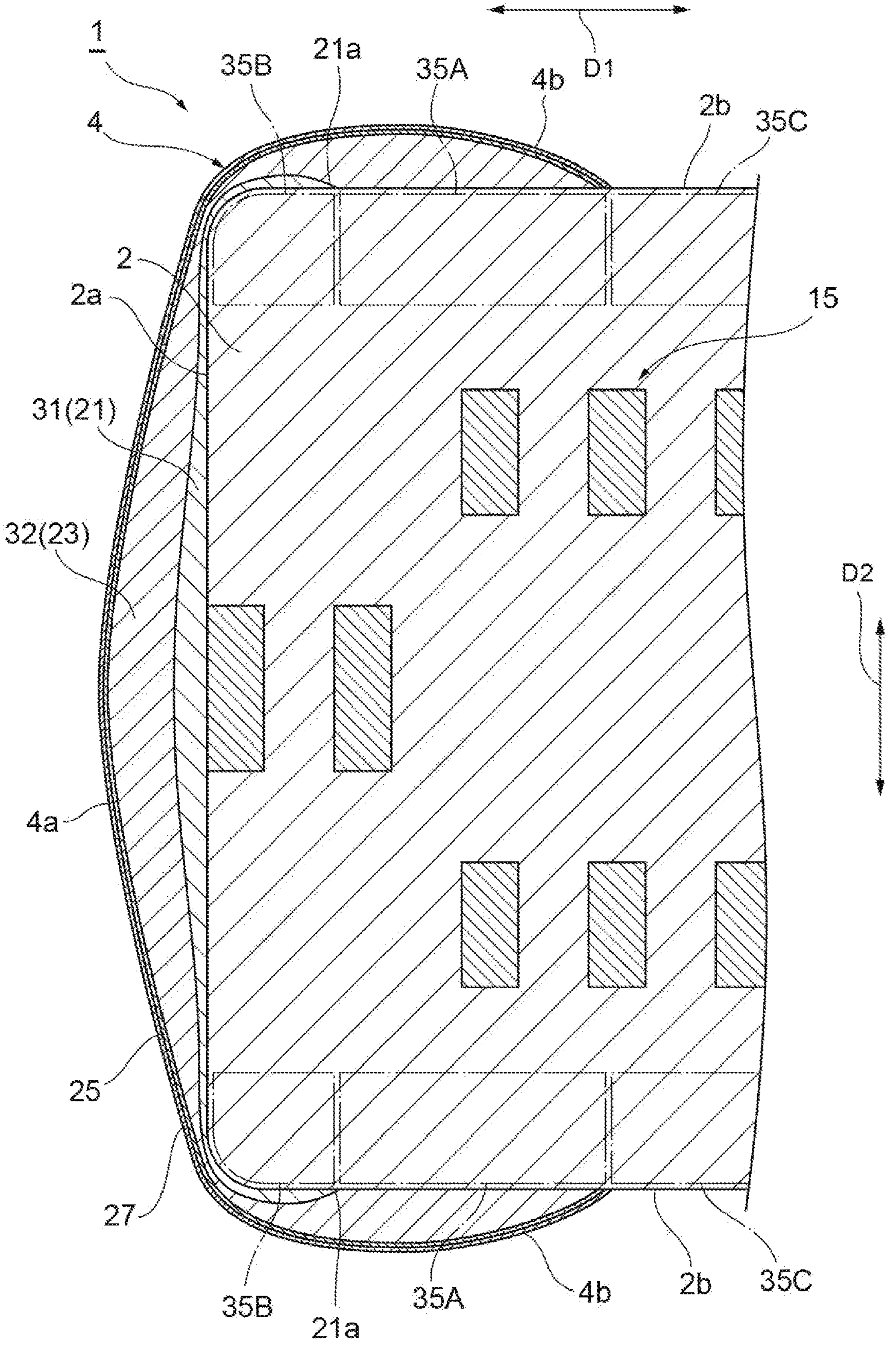
FIG. 8 is a diagram illustrating a cross-sectional configuration of an external electrode of a multilayer coil component according to a modification example and an element body around the external electrode.

Although the lamination direction of the magnetic body layers 11 coincides with the facing direction of the main surfaces 2*b* and 2*b* in the embodiment described above, the lamination direction of the magnetic body layers may intersect with (be orthogonal to) the main surfaces 2*b* and 2*b* as illustrated in, for example, FIG. 8. In the example of FIG. 8, the external electrodes 4 are respectively provided so as to cover the end surfaces 2*a* and 2*a* of the element body 2 and the lamination direction of the magnetic body layers coincides with the direction in which the end surfaces 2*a* and 2*a* of the element body 2 are connected. In other words, in the example of FIG. 8, the direction in which the coil 15 in the element body 2 is formed coincides with the direction in which the end surfaces 2*a* and 2*a* of the element body 2 are connected. Also in such an aspect, the second resin R2 connected from the resin electrode 32 extends into the element body 2 (see FIG. 7). Accordingly, the aspect and the embodiment are similar in action and effect.

What is claimed is:

1. A multilayer coil component comprising:

an element body containing a plurality of metal magnetic particles;

a coil disposed in the element body; and an external electrode disposed on a surface of the element body and electrically connected to the coil, wherein at least a part of a space between the metal magnetic particles in the element body is filled with a first resin, the external electrode has a resin electrode containing a second resin and a conductor powder dispersed inside of the second resin, the second resin connected from the resin electrode penetrates inside of the element body, the external electrode has a base baking electrode between the resin electrode and the element body, and the second resin wraps around the base baking electrode so as to extend into the element body and further extends to a part where the element body and the base baking electrode are in contact with each other in the element body.

2. The multilayer coil component according to claim 1, wherein the first resin and the second resin are bonded to each other in the element body.

3. The multilayer coil component according to claim 2, wherein the first resin and the second resin are the same kind of resin.

4. The multilayer coil component according to claim 1, wherein the second resin extends to a part where the element body and the resin electrode are not in contact with each other in the element body.

5. The multilayer coil component according to claim 1, wherein second resin penetrates inside of the element body so as to fill a void of the element body existing entirely beyond a boundary of the element body.

* * * * *